(12) United States Patent
Solano

(10) Patent No.: US 8,978,349 B2
(45) Date of Patent: Mar. 17, 2015

(54) HORIZONTAL PACKAGING MACHINE

(75) Inventor: José Mª Broto Solano, Barcelona (ES)

(73) Assignee: Eficiencia y Tecnologia, S.A., Barbera del Valles (Barcelona) (ES)

( * ) Notice: Subject to any disclaimer, the term of this patent is extended or adjusted under 35 U.S.C. 154(b) by 640 days.

(21) Appl. No.: 13/324,641

(22) Filed: Dec. 13, 2011

(65) Prior Publication Data

US 2012/0151874 A1  Jun. 21, 2012

(30) Foreign Application Priority Data

Dec. 15, 2010 (ES) .................................. 201031850

(51) Int. Cl.

| | | |
|---|---|---|
| *B65B 43/02* | (2006.01) | |
| *B65B 43/04* | (2006.01) | |
| *B65B 1/02* | (2006.01) | |
| *B65B 43/12* | (2006.01) | |
| *B65B 43/46* | (2006.01) | |
| *B65B 43/60* | (2006.01) | |
| *B65B 51/14* | (2006.01) | |
| *B65B 61/06* | (2006.01) | |
| *B65B 3/02* | (2006.01) | |
| *B29C 65/18* | (2006.01) | |
| *B29C 65/00* | (2006.01) | |

(52) U.S. Cl.
CPC . *B65B 1/02* (2013.01); *B65B 43/04* (2013.01); *B65B 43/12* (2013.01); *B65B 43/465* (2013.01); *B65B 43/60* (2013.01); *B65B 51/146* (2013.01); *B65B 61/06* (2013.01); *B65B 3/02* (2013.01); *B29C 65/18* (2013.01); *B29C 66/1122* (2013.01); *B29C 66/431* (2013.01); *B29C 66/43121* (2013.01); *B29C 66/83543* (2013.01); *B29C 66/849* (2013.01); *B29C 2793/009* (2013.01)
USPC .......................................................... 53/562

(58) Field of Classification Search
CPC ........ B65D 75/30; B65D 85/04; B65B 43/12; B65B 43/465; B65B 11/00; B65B 11/50; B65B 15/00; B65B 25/14; B65B 43/04; B65B 51/02; B65B 61/06; B65B 63/04; B29C 66/43121
USPC ........... 53/432, 471, 485, 488, 489, 510, 511, 53/545, 562, 281
See application file for complete search history.

(56) References Cited

U.S. PATENT DOCUMENTS

| | | |
|---|---|---|
| 2,923,111 A | 2/1960 | Selcok |
| 3,230,687 A | 1/1966 | Nutting et al. |
| 3,473,294 A | 10/1969 | Bateman |
| 4,156,336 A * | 5/1979 | Tabaroni et al. ................. 53/562 |
| 5,564,259 A * | 10/1996 | Stolmeier ........................ 53/410 |
| 5,653,085 A | 8/1997 | Suga |
| 7,510,756 B2 * | 3/2009 | Ribi ............................... 428/138 |
| 2010/0105783 A1 * | 4/2010 | Lee et al. ....................... 514/777 |

FOREIGN PATENT DOCUMENTS

| | | |
|---|---|---|
| EP | 0 999 139 | 5/2000 |
| EP | 1 710 162 | 10/2006 |

* cited by examiner

*Primary Examiner* — Robert Long
(74) *Attorney, Agent, or Firm* — Lesaon Ellis LLP

(57) ABSTRACT

Machine that consists in a horizontal sequence: a uncoiling station for a flexible sheet, a station for the formation of the packet in a folded "V", a sealing station of the packet, an individual cutting station of the packet, a station for the individual transport of the packets to a filling station, and a station for the closing of the packets. The sealing and cutting stations comprise longitudinal guides for the assembly of sealing and cutting means corresponding to a linear displacement means which provides alternate linear movements forwards and backwards in the trajectory of the flexible sheet. With each forward movement, said means moves at the same speed as the flexible sheet, and is placed in an operative position by a driving means.

5 Claims, 5 Drawing Sheets

HORIZONTAL PACKAGING MACHINE

OBJECT OF THE INVENTION

The present invention relates to a horizontal packaging machine, specifically, a packaging machine for the formation and filling of flexible packets, sachet type or similar, in which a continuous sheet passes through horizontally placed stations in a continuous process.

FIELD OF APPLICATION OF THE INVENTION

The packaging machine of this invention is applicable in the packaging industry, for the packaging of various products in packets of sachet type or similar.

PRECEDENTS OF THE INVENTION

At present, various automatic machines used for the packaging of products in flat packets, sachets or similar, are known.

These machines consist in a horizontal sequence: an uncoiling station for a flexible heat-sealable sheet, a station for the formation of the packet by folding the flexible sheet into a "V", a station to seal the bottom and sides of the packet, a cutting station to separate consecutive packets, a station for the individual transportation of the separated packets to a filling station, and a final closing station for the packets containing the packaged product.

The uncoiling station normally consists of two coils that supply the flexible heat-sealable sheet, in such a way that when one coil ends, the flexible sheet is supplied by the other, such the used coil can be replaced without stopping the machine.

The sealing station for the bottom and sides of the packet consists of a sealing means, essentially comprising two opposing heated plates, placed on either side of the trajectory of the flexible sheet. In turn, the cutting station for the separation of consecutive packets consists of a cutting means, namely, shears with blades on either side of the flexible sheet.

These horizontal packaging machines work with an intermittent forward movement of the flexible heat-sealed sheet, with the sealing, cutting and filling of the packets taking place when the forward movement of the sheet stops. These stations are fitted respectively with heated plates, for the sealing the bottom and sides of the packet, a cutting means to separate the formed packets from the rest of the sheet, and dosage devices to supply the product into the consecutive packets.

This stopping and starting movement does not provide a fast production of packets due to the loss of time entailed by stopping and starting operations, as the flexible sheet is stationary for a considerable part of the work cycle, often greater than 50%. In addition, the depositing of the product inside the packets during the time that the packets remain stationary is especially problematic in the case of certain products, and when there is an elevated quantity of product to place in each packet. In these cases, the stopping time between consecutive forward movements is inevitably increased, which leads to a reduction in production capacity.

DESCRIPTION OF THE INVENTION

The horizontal packaging machine object of this invention presents technical features intended to achieve continuous production, without the typical intermittent stops in the forward movement of the flexible sheet, and as a result, to significantly increase the production of the packaging machine.

The machine is of the type that comprises a horizontal sequence: a uncoiling station for a flexible heat-sealable sheet, a station for the formation of the packet by folding the flexible sheet into a "V", a station to seal the bottom and sides of the packet with a sealing means consisting of two opposing heated plates placed on either side of the trajectory of the flexible sheet, a cutting station to separate consecutive packets, consisting of a cutting means, namely, shears with blades on either side of the flexible sheet, a station for the individual transportation of the previously separated packets to a filling station, and a final closing station for the packets containing the packaged product.

According to the invention, the sealing and cutting stations comprise longitudinal guides for the assembly of sealing and cutting means corresponding to a linear displacement means which provides alternate linear movements forwards and backwards along the trajectory of the flexible sheet. With each movement, said means moves at the same speed as the flexible sheet, and is placed in an operative position by a driving means to carry out the respective sealing and cutting of consecutive packets.

In turn the filling station consists of dosage devices that trace a continuous circular movement, at a speed that coincides with that of a horizontal carrousel which transports the packets that have been separated at the cutting station; for a considerable part of their trajectory said dosage devices will remain aligned with the openings of the consecutive packets transported by the horizontal carrousel, so that during this coinciding trajectory the product is deposited inside the packets.

The means provided at the sealing and cutting stations allow the different operations of sealing and cutting of the packets to take place while the sheet is in movement, i.e. without the need for an intermittent movement of the sheet. In this way a considerable increase in production is achieved, given that the sealing and cutting of the packets is produced during the continuous forward movement of the sheet.

The displacement means are especially controlled so that they move at the exact speed of the flexible sheet in its forward movement; as such the relative displacement in this cycle of manufacture is nil, thereby avoiding problems of time lag. These displacement means may be of a diverse nature, such as linear servo motors, spindle bearings or others.

The time taken by the sealing and cutting means to return to the point of origin is expected to be lower than the time taken in moving forward, in order to give a margin to the execution of the work cycle.

The driving means of the heated plates of the sealing station, and the shears of the cutting station, consists of a supporting probe aligned to a longitudinal track that moves intersecting the forward movement of the flexible sheet, for the driving of the corresponding station.

These driving means allows for the regulation of the sealing means and the cutting means of the respective stations, independently of the longitudinal displacement of said sealing means and cutting means. In this way said sealing and cutting means can be brought close and moved away precisely and gradually during the forward movement when the relative speed between the flexible sheet and the sealing means and cutting means is at its minimum, preferably nil.

In order to supply the dosage devices of the filling station with the product that will be inserted into the packet during the continuous movement, the filling station comprises fixed dispensers, placed at a given point of the trajectory of the dosage devices and above the area where they pass. The aforementioned fixed dispensers are responsible for supplying the product to the consecutive dosage devices in a single or various steps, and the product is then inserted into the respective packets.

DESCRIPTION OF DRAWINGS

By way of complementing the present description, and with the aim of facilitating understanding of the characteristics of the invention, this descriptive summary is accompanied by a set of drawings which include, but are not limited to, the following features.

PREFERRED EMBODIMENT OF THE INVENTION

Figure 1:
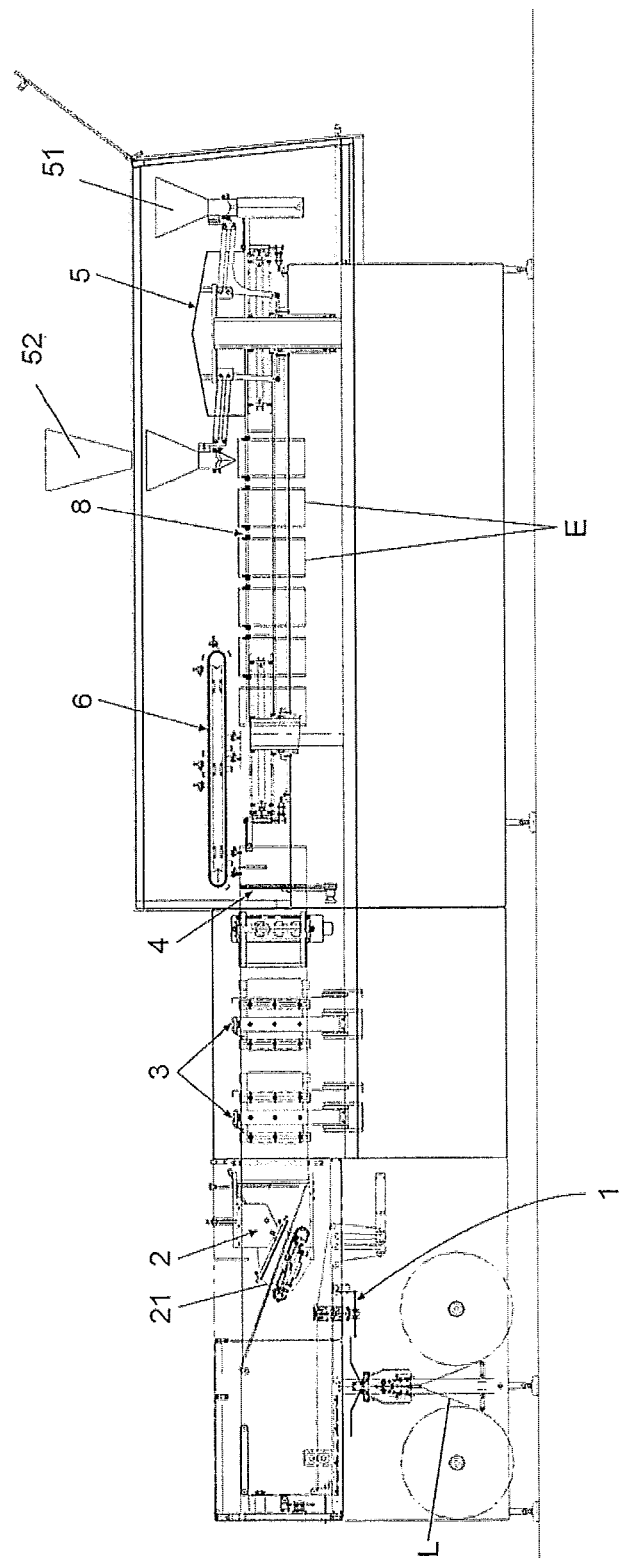
FIG. 1 is a schematic front elevation view of the machine

As can be seen in the referenced figures the horizontal packaging machine consists of a horizontal sequence of stations through which a flexible heat-sealable sheet (L) passes, for the formation of packets (E). The first station is a uncoiling station (1) with two coils of flexible sheet (L) for continuous supply by one coil when the other is finished. Next is the station for the formation of the packet (2) in a folded "V" from the flexible sheet (L) by means of a folding means (21), in such a way that the flexible sheet (L) remains folded in a "V" moving forwards horizontally and with the opening facing upwards. After the formation station (2) are a sealing station (3) for the sealing of the bottom and sides of the packet (E) and a cutting station (4) for the separation of consecutive packets (E) to be filled at the filling station (5), as the packets (E) are taken from the cutting station (4) to the filling station (5) by means of an individual transportation station (6).

Figure 2:
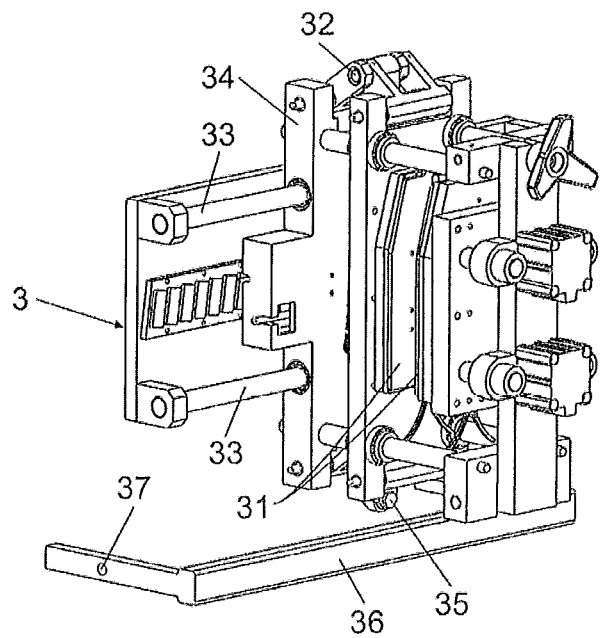
FIG. 2 is a perspective view of the sealing station with the displacement means and the driving means.
Figure 3:
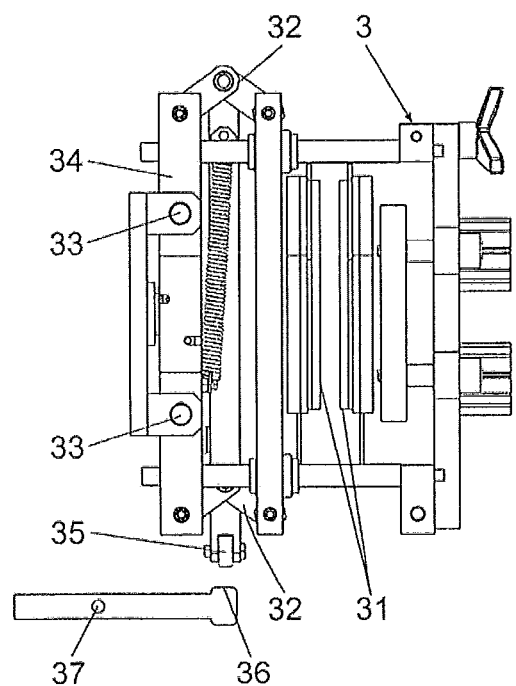
FIG. 3 is a cross-section view of the previous figure.
Figure 4:
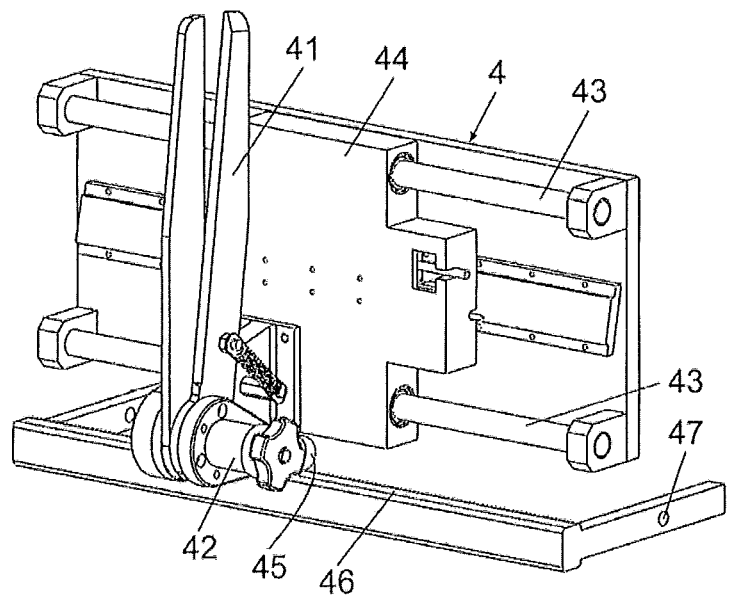
FIG. 4 is a perspective view of the cutting station with the displacement means and the driving means

The sealing station (3), represented in FIGS. 2 and 3, consists of a sealing means comprised of heated plates (31) placed on either side of the trajectory of the folded flexible sheet (L). The sealing station (3) comprises longitudinal guides (33) for the assembly of a transportation carriage (34) for the sealing means, which moves by motorized means, in this case a linear servo motor.

The carriage (34) consists of arms upon which a heated plate (31) is fixed, and upon these arms a mobile element and the displacement joints (32) of the other heated plate (31).

The sealing station (3) consists of a driving means for the sealing means, independent of the displacement means; said driving means consists of a probe (35), which in this case supports one of the joints (32) of the mobile element, and a longitudinal track (36) that moves intersecting the forward movement of the flexible sheet (L).

In this case the longitudinal track (36) is supported at each end by two tilting arms on a tilting axis (37) by means which are not represented, such that the perpendicular tilting of the aforementioned longitudinal track (36) pushes the end of the probe (35), where a rolling wheel is placed.

Figure 5:
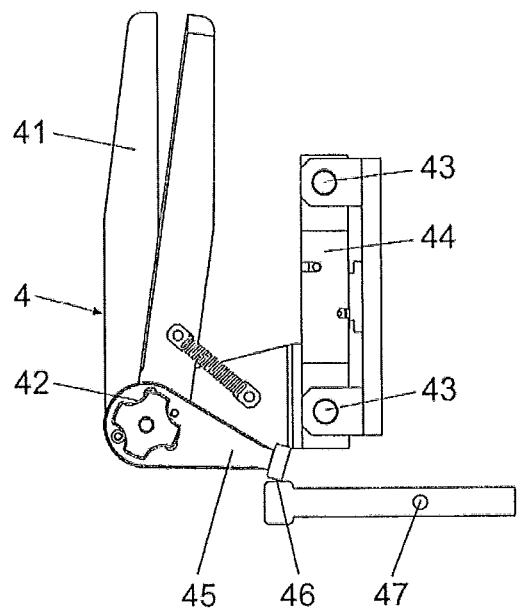
FIG. 5 is a cross-section view of the previous figure.
Figure 6:
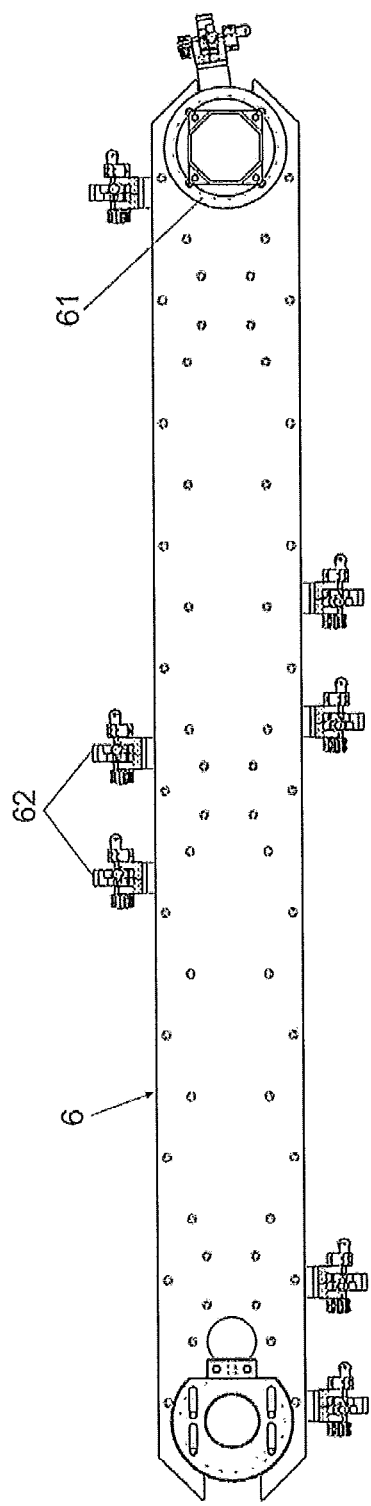
FIG. 6 is a front elevation view of the individual transportation station.

The cutting station (4), represented in FIGS. 5 and 6, consists of a cutting means configured by a set of shears (41) fixed on a joint (42), on both sides of the flexible sheet (L), when the packets (E) have already been formed and the bottom and sides sealed, so that once the individual packets (E) have been cut the opening is facing upwards ready for filling.

This cutting station (4) likewise consists of longitudinal guides (43) for the assembly of the cutting means, specifically a shearing blade (41) fixed upon a moveable carriage (44), while the other corresponding moveable blade of the shears (41) presents a driving means. This driving means consists of a probe (45) that supports the mobile blade of the shears (41), with its end placed upon a longitudinal track (46), with a contact wheel.

The longitudinal track (46) likewise comprises arms at each end that tilt on a tilting axis (47), to drive the aforementioned shears (41) by pushing the longitudinal track (46), thereby allowing its movement along the cutting means.

As has been cited, at the end of the cutting station (4) is the station for the individual transportation (6) of the packets, consisting of a vertical carrousel (61) that carries clips (62) for the extraction of the packets (E) one by one by their upper edge. The speed of extraction of the packets (E) is greater than the speed at which the packets leave the cutting station (4), in order to produce a separation space between the packets (E) before they pass through the filling (5) and closing (7) stations.

Figure 7:
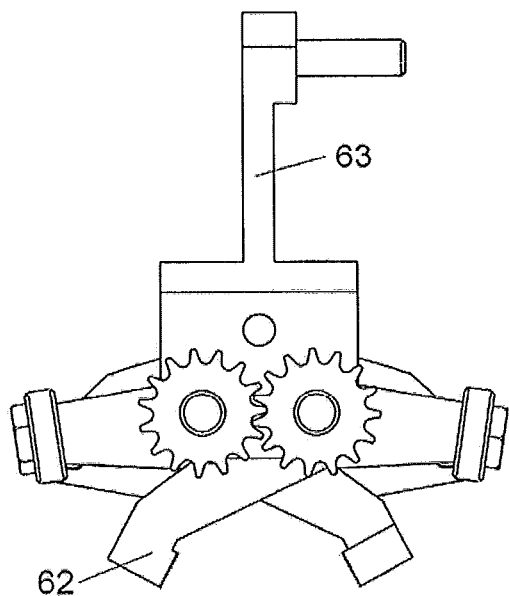
FIG. 7 is a cross-section view of an extraction clip from the individual transportation station.
Figure 8:
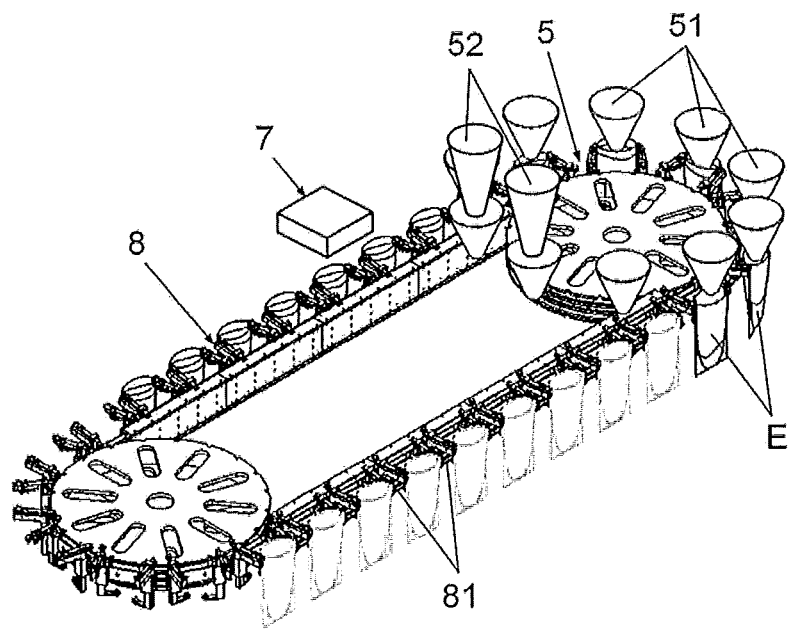
FIG. 8 is a perspective view of the filling station.

These extraction clips (62), represented in FIG. 7, are joined to the vertical carrousel (61) by means of an automatic clutch (63), which allow the automatic opening and closing that is necessary for the autonomous picking, transporting and release of the packet (E).

The filling station (5) is placed in correspondence with a curved section of the trajectory of a horizontal carrousel (8), placed approximately underneath the vertical carrousel (61) of the individual transportation station (6).

The horizontal carrousel (8) consists of clips (81) aligned to hold the packets (E) by their vertical sides. These aligned clips (81) can move towards one another, thereby opening the top of the packet (E) being held, for it to be filled with the product for packaging by dosage devices (51) at the filling station (5) which trace a continuous circular movement, at a speed that coincides with that of the aforementioned horizontal carrousel (8). As such, said dosage devices (51) remain for a considerable part of their trajectory aligned with the openings of consecutive packets (E) that are being transported by the horizontal carrousel (8), thereby allowing a considerable increase in the time available to deposit the product and fill the packets.

At a given point in the trajectory of the dosage devices (51), and above the area through which they pass, are fixed dispensers (52) which supply them, in a single or various steps, with the product that is to be inserted into its respective packets during its continuous displacement.

Once the packets (E) are filled with the product, the aligned clips (81) of the horizontal carrousel move apart, causing the closure of the packets, then the packets are transported by the horizontal carrousel (8) to the closing station (7) in which the upper opening of consecutive packets is sealed.

Although the present invention has been described as an example of a given preferred embodiment, for the record and for relevant purposes, the materials, form, size and provision of the described elements may be modified, whenever this does not suppose an alteration of the essential characteristics of the invention, which are claimed as follows.

The invention claimed is:

1. A horizontal packaging machine comprising a plurality of stations arranged in a horizontal sequence through which a flexible heat-sealable sheet is moved, the stations including:

an uncoiling station for uncoiling said flexible heat-sealable sheet, a folding station for the formation of a V-shaped flexible sheet by V-folding the uncoiled flexible heat-sealable sheet, a sealing station for the sealing of bottom and side ends of the V-shaped flexible sheet to form side-joined consecutive packets, said sealing station comprising sealing means comprising two opposing heated plates placed on either sides of the trajectory of the V-shaped flexible sheet, said heated plates being relatively movable with respect to each other between a far position where there is a gap between the heated plates through which the V-shaped flexible sheet passes and a close position at which the V-shaped flexible sheet is firmly trapped between the heated plates and the end sealing is performed, a cutting station comprising cutting means comprising shears with two opposite blades relatively movable with respect to each other and arranged on either sides of the trajectory of said side-joined consecutive packets for the separation of the side-joined consecutive packets by side cutting them when the pass between the two opposite blades, a transporting station comprising a horizontal carrousel for the individual transportation of the previously separated packets to a filling station, said horizontal carrousel moving at a certain speed, said filling station, which comprises movable dosage devices arranged to move according to a continuous circular trajectory, at a speed that coincides with said certain speed at which said horizontal carrousel moves, wherein for a considerable part of said continuous circular trajectory outputs of said dosage devices remain aligned with upper openings of the consecutive packets transported by the horizontal carrousel, the dosage devices being configured for filling the packets during said alignment by depositing a product therein through their respective upper openings, and a final closing station for closing said upper openings of the packets containing the packaged product filled at the filling station, wherein the sealing and cutting stations comprise longitudinal guides for the assembly of respective transportation carriages of said sealing means and said cutting means, and linear displacement means for linearly moving said transportation carriages along their corresponding longitudinal guides according to alternate linear movements forwards and backwards in the trajectory of the flexible sheet, at least the forward linear movement being provided at the same speed as the continuous forward movement of the flexible sheet, such that the carriages are placed in respective operative positions to carry out the respective sealing and cutting of consecutive packets while the flexible sheet moves.

2. The machine according to claim 1, further comprising driving means to move the relatively movable heated plates of the sealing station with respect to each other, and driving means to move the relatively movable opposite blades of the shears of the cutting station with respect to each other, each of said driving means comprising a mechanical feeler attached thereto and facing respective longitudinal track that moves transversely with respect to and upon the forward movement of the flexible sheet, for the driving of the corresponding station.

3. The machine according to claim 1, wherein the dosage device comprises fixed dispensers, placed at a given point in the trajectory of the dosage devices, and above the area through which they pass, and which supply said dosage devices, in a single or various steps, with the product that is to be inserted into its respective packets.

4. The machine according to claim 1, wherein said mechanical feeler of the sealing station is attached to a joint of a mobile element attached to one of the two heated plates and the longitudinal track is supported at each end by two tilting arms on a tilting axis, said transverse movement of the longitudinal track being the tilting thereof about said tilting axis and provoking the pushing, by the faced longitudinal track, of a rolling wheel placed at the end of the mechanical feeler to act on said joint to move said mobile element and the heated plate attached thereto.

5. The machine according to claim 1, wherein said mechanical feeler of the cutting station is attached to a mobile blade of the shears of the cutting station and comprises, at its end, a contact wheel placed upon said longitudinal track, and the longitudinal track is supported at each end by two tilting arms on a tilting axis, said transverse movement of the longitudinal track being the tilting thereof about said tilting axis and provoking the pushing, by the faced longitudinal track, of said contact wheel to move said mobile blade of the shears.

* * * * *